Figure 3:
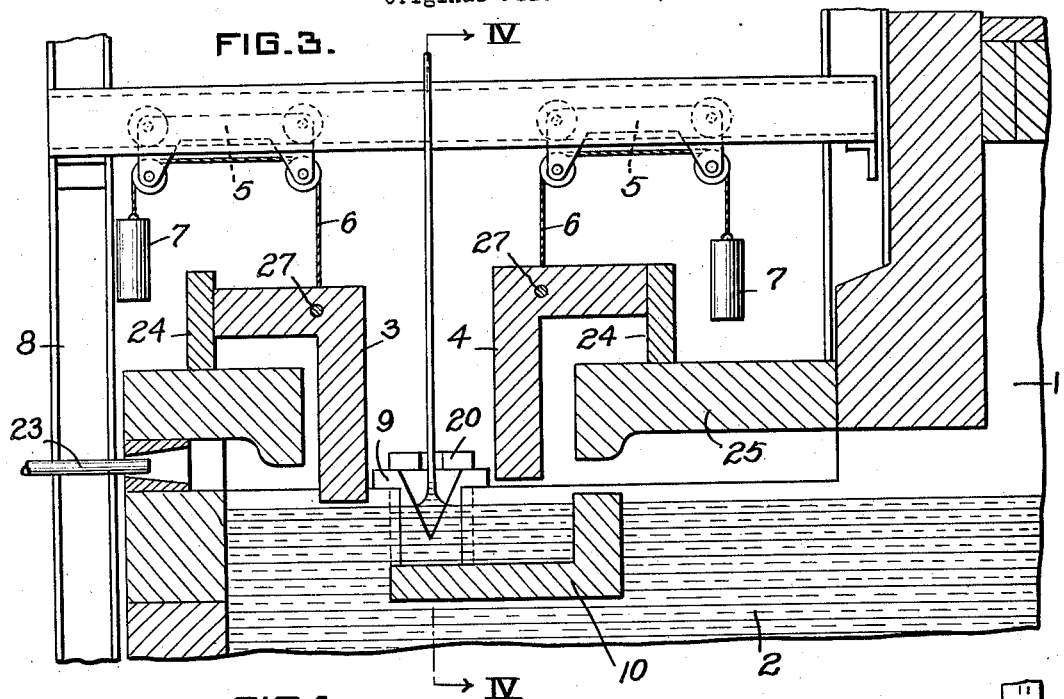

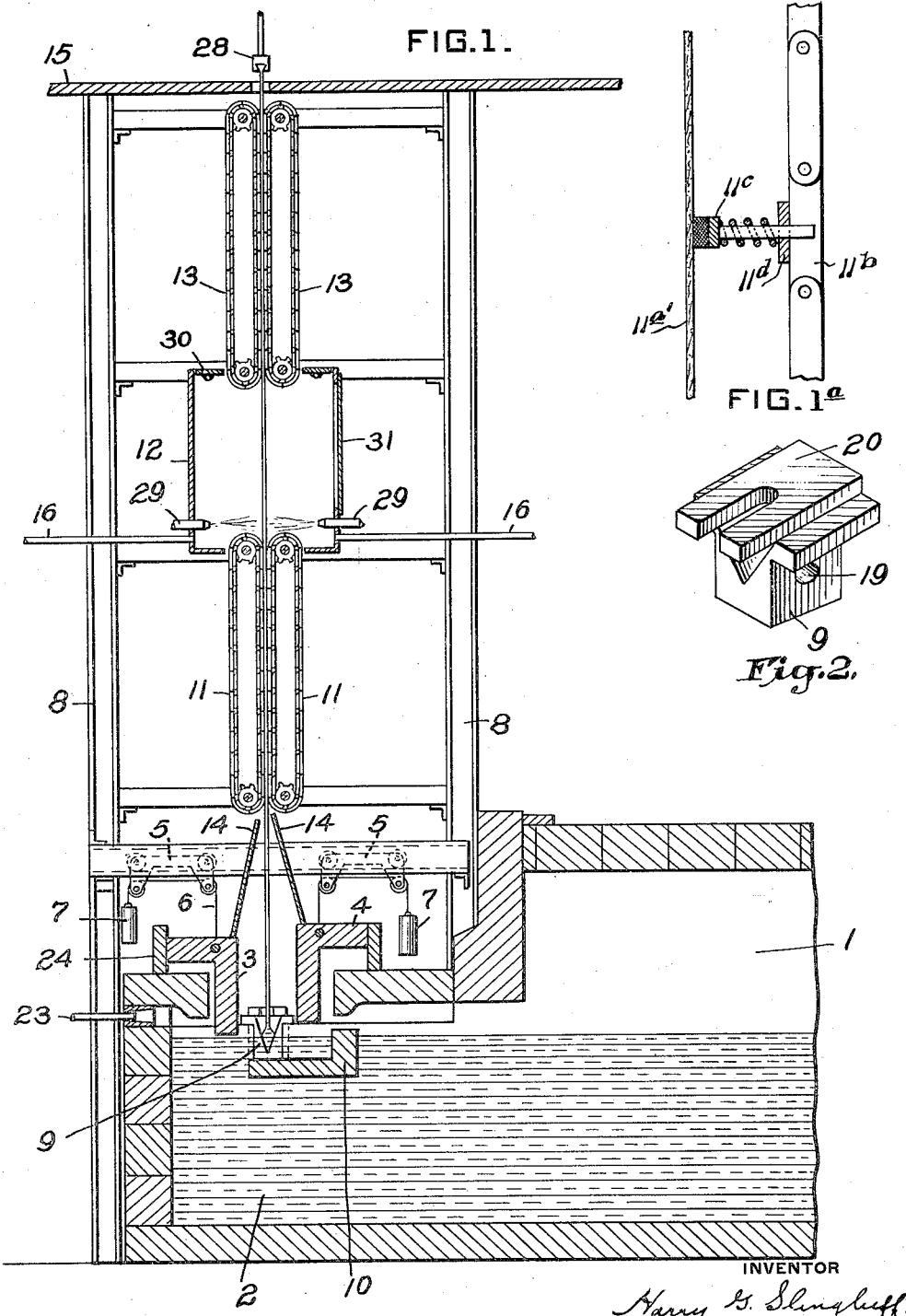

July 7, 1925.　　　　　　　　　　　　　　　　　　　　1,544,947
H. G. SLINGLUFF
APPARATUS FOR DRAWING GLASS
Original Filed Dec. 5, 1918　　2 Sheets-Sheet 2

INVENTOR
Harry G. Slingluff
by James C. Bradley
atty

WITNESSES

Patented July 7, 1925.

1,544,947

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

APPARATUS FOR DRAWING GLASS.

Application filed December 5, 1918, Serial No. 265,443. Renewed April 11, 1923.

*To all whom it may concern:*

Be it known that I, HARRY G. SLINGLUFF, a citizen of the United States, and a resident of Mount Vernon, in the county of Knox and State of Ohio, have made a new and useful Invention in Apparatus for Drawing Glass, of which the following is a specification.

The invention relates to an apparatus for drawing sheet glass, the apparatus herein shown and described constituting an improvement over what is shown and described in my copending applications Serial Numbers 225190 and 244365, (now Patents 1,364,895 and 1,339,229) filed respectively on March 28, 1918 and July 11, 1918. It has for its principal objects, (1) the provision of improved means for maintaining the sheet of glass produced straight during the drawing operation, (2) and the provision of improved means for continuously drawing and annealing the glass sheet. Certain embodiments of the invention are illustrated in the accompanying drawing, wherein;

Figure 1 is a vertical section through the preferred form of apparatus, Fig. 1ª is an enlarged vertical section through the endless belt construction of Fig. 1, Fig. 2 is a perspective view on an enlarged scale of one of the drawing blocks. Fig. 3 is a vertical section through the lower portion of the apparatus on a larger scale than that of Fig. 1, Fig. 4 is a vertical section on the line IV—IV of Fig. 3, and Figs. 5, 6 and 7 are vertical sections illustrating modifications of the construction shown in Fig. 3.

Referring first to the general arrangement as shown in Fig. 1, the principal parts of the apparatus may be enumerated as follows; 1 is the melting tank communicating at its left hand end with an extension or what is known as the drawing tank; 3 and 4 are curtain blocks supported upon the trolley members 5 by means of the cables 6 and counterweight 7 in order to permit of an adjustment of the blocks; 8 is a frame work, preferably of commercial sections, which carries the drawing mechanism above the tank and supports the trolleys 5; 9 are drawing blocks located at the ends of the sheet being produced and following the construction illustrated and described in my copending applications heretofore referred to; 10 is a refractory cooling block located in the body of molten glass; 11 are endless belts of refractory material for drawing the glass upward and annealing it; 12 is a heating chamber through which the sheet of glass passes in its upward movement; 13 are a second pair of endless refractory belts for receiving the glass sheet and completing the annealing operation; 14 are a pair of shields, preferably of sheet metal, located between the curtain blocks and the first pair of endless belts; and 15 and 16 are platforms or floors for the use of the operators, the glass preferably being cut off in sections or sheets and carried away after it passes above the floor 15.

Figure 4:
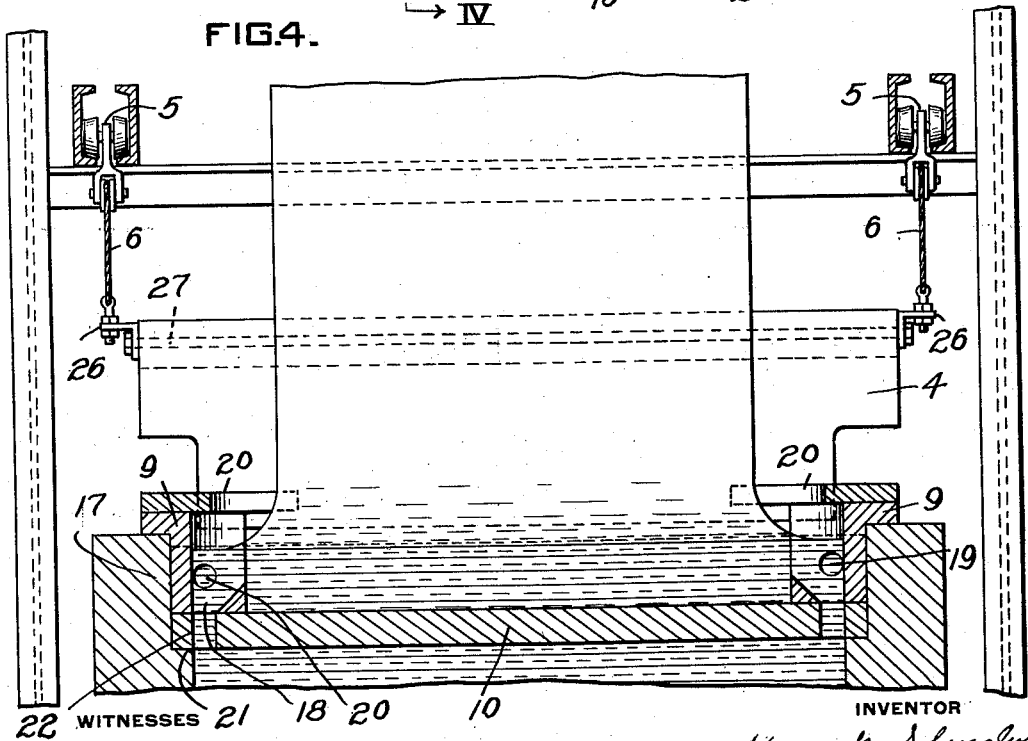

The construction of the drawing blocks 9 and their method of support will be seen by reference to Figs. 2 and 4, such blocks being supported in the side walls 17 of the melting tank, and being similar in construction to the drawing blocks illustrated and described in my copending applications. These blocks are designed to maintain the width of the sheet and supply anchors of relatively cool glass between the edges of the sheet being formed and the body of glass in the drawing tank. As in the construction of the said applications, passages 18 are provided for permitting a supply of relatively hot glass from beneath to the pockets of glass in the blocks, but in addition the side passages 19 are also provided for permitting a flow of glass to the interior of the blocks from the side. In order to prevent a too rapid cooling of the edges of the sheet of glass, the shields 20 are provided. These shields reflect the heat radiated from the glass beneath and also protect the edges against air currents tending to cool them unduly. The shields may be made integral with the blocks 9, but are preferably made separate, as illustrated, so that they may be adjusted to meet requirements. For instance, one side of the sheet might be exposed to greater cooling action than the other, and in that case the block would be adjusted out farther on such side in order to better hold the heat and protect the edge at that side of the sheet from a too rapid cooling. The use of these shields also permits of an adjustment to meet varying conditions of temperature in the glass bath itself. If the glass is too fluid at the edges of the sheet, the tendency of the sheet is to narrow, and in that case the condition would be met by adjusting the shielding blocks out farther. On the other hand, if the edges of the sheet become too stiff, the condition may be met by adjusting the blocks inward, thus causing an increase in temperature in the glass at the edges of the sheet.

Lying in the glass beneath the drawing blocks 9 is the cooling block 10, such cooling block having its vertical side extending slightly above the surface of the glass, as indicated in Fig. 3, and being held in position by means of the drawing blocks 9, as indicated in Fig. 4. The ends of the member 10 rest upon shoulders 21 in the side walls of the drawing tank, and are held in position by means of the drawing blocks, the opening 18 through the bottom of each drawing block registering with an opening 22 at the end of the member 10.

The member 10 not only serves to cool the body of segregated glass lying thereabout and thus give the necessary stiffness for drawing, but also performs the function, when taken in conjunction with the curtain blocks 3 and 4, of maintaining the sheet straight. The body of glass in the drawing tank on the side next to the melting tank normally runs higher than that on the side of the sheet remote from the melting tank. The side away from the melting tank is heated by means of the burners 23, but this is not sufficient to bring the temperature in this side of the tank up to that on the other side. The greater heat on the side of the sheet toward the melting tank combined with the flow of glass incident to the drawing of the sheet tends to cause a bowing of the sheet toward the cold side, that is away from the melting tank, and the member 10, used in connection with the curtain blocks 3 and 4, serve to counteract this tendency. The vertical side of the cooling member 10 serves to cut off some of the heat from the body of glass to the right of such side (Fig. 3) and also serves to interrupt any current to the left incident to the withdrawal of the glass forming the sheet. The temperature conditions in the body of glass from which the drawing occurs are therefore equalized on the two sides of the sheet and the sheet draws straight instead of bowing toward the left (Fig. 3), as was the case when the glass on such side was cooler than the glass on the other side.

The provision of the curtain blocks 4 gives a means whereby the temperature of the segregated body of glass from which the drawing occurs may be regulated. This block may be moved up and down and toward and away from the sheet being drawn, the movable slab 24 serving to close the space between the horizontal end of the curtain block and the roof block 25 of the drawing tank. When the curtain block 4 is adjusted toward the sheet, an increased heating effect upon the segregated body of glass is secured, as the heated gases below the roof block 25 impinge against the rear face of the curtain block and are reflected down upon the glass lying in the angle of the member 10. The heating effect from the melting end of the tank may, on the other hand, be reduced either by adjusting the block 4 away from the glass sheet or down, thus narrowing the space through which the heated gases may be applied to the segregated body of glass lying above the member 10. A further adjustment as to the relative heat on the two sides of the glass sheet may be secured by adjusting the curtain block 3, which block may also be adjusted up and down as well as toward and from the sheet. In case the body of glass from which the drawing occurs becomes too cool, although at such time the sheet is drawing straight, an increase in temperature may be secured by adjusting both of the curtain blocks toward the sheet. It is also possible to tilt the curtain blocks, since the two ends are supported independently, as indicated in Fig. 4, and this tilting might be advisable in case the temperature conditions, due to draughts or the like, became unequal at the two ends of the tank. In that case the curtain blocks would have to be tilted so that their lower edges were farther away from the glass at the end of the tank which was coolest. Similarly the curtain blocks might be tilted toward or from the sheet by running the trolleys at one side closer than at the other side. These various possibilities of adjustment are advantageous because of the difficulty in maintaining fixed conditions of temperature in the tank and because of the variation in temperature conditions outside the tank. By observing the conditions of the sheet being drawn, the various adjustments can be made to suit conditions, and in some cases these adjustments must be made while the draw is in progress.

The curtain blocks 3 and 4 are preferably supported by the cables 6, and, as indicated in Fig. 4, the upper ends of these cables passing over pulleys carried by the trolleys 5 and secured to the counterweights 7. The lower ends of the cables are secured to angle irons 26, maintained in position by means of reinforcing rods 27, which extend from one side of the curtain blocks to the other side.

In order to prevent a too rapid cooling of the sheet, intermediate the point of the drawing and the endless belts 11, the shields 14 are preferably employed, such shields being made of sheet metal or other suitable material. Similar shields (not shown) are also preferably employed at the ends of the sheet, such shields preferably extending from just above the drawing blocks 9 to the lower ends of the endless belts 11. These shields prevent a too rapid cooling of the sheet and shield it from draughts which would tend to cause unequal cooling and warping.

The endless belts 11 and 13 are similar in construction to those illustrated in my copending applications heretofore referred to. The mechanism preferably comprises suitable sprocket chains passing around the sprocket wheels shown in Fig. 1, and carrying asbestos bands somewhat wider than the sheet of glass being drawn, so that the sheet of glass is entirely covered by the asbestos and its heat is maintained, and so that the cooling of the glass, as it moves upward, is relatively slow. Suitable power means is applied to drive the sprocket wheels and the asbestos belts not only act as heat retaining means for annealing the glass, but also as drawing means for applying the necessary tension to continually pull the sheet after the bait 28 (Fig. 1), by means of which the draw is started, has passed above the floor 15 and been cut off. The endless belt construction, like that of my copending application, comprises asbestos bands or belts 11ª (Fig. 1ª) supported upon chains 11ᵇ, by means of the spring pressed plungers 11ᶜ having asbestos pads on the ends. These plungers are arranged in series across the bars 11ᵈ, which bars extend across from one chain to the other, so that the inner flights of the bands press yieldingly against the sheet of glass passing therethrough. These bands, pressing yieldingly against the sheet and gripping it, act as a drawing means, and the pressure, as thus distributed by the rows of independently yielding plungers, avoids the tendency to crack the glass, which otherwise exists with glass which is not flat when the pressure is applied over a large area by one pressure element.

Intermediate the two sets of belts 11 and 13 is a heating chamber 12, such chamber being located above the platform 16 and being supplied with suitable gas burners 29. Doors or dampers 30 are also preferably provided in the upper end of the chamber, in order to permit a cooling of this chamber if this becomes necessary. One side 31 of the chamber is removable for giving access to the chamber. One purpose of this chamber is to permit of the application of additional heat to the chamber, for annealing purposes, if this becomes necessary, and a second purpose is to provide opportunity for the removal of broken glass in case the sheet breaks above the endless belts 11. In case such breakage occurs, the broken places fall down into the chamber and can be removed without stopping the draw. Two sets of belts are illustrated and one intermediate chamber, but it will be understood that more sets of belts and chamber may be used if desired or necessary. The glass is cut off by operators standing upon the platform 15 and removed to the cutting room. No further annealing or flattening is necessary as the sheet is drawn flat by reason of the means as heretofore set forth, and the belts of asbestos hold the heat long enough to give it necessary annealing.

What I claim is:

1. The combination with a glass melting tank and a glass drawing tank communicating therewith at one end and provided with a top having a transverse sheet drawing opening, of transversely extending refractory means, L shape in cross section having a horizontal portion extending below the line of generation of the sheet to be drawn and serving to segregate the glass thereabove from the main body of glass in the drawing tank and having a vertical portion lying intermediate said sheet and the melting tank and extending above the surface of the glass, and an adjustable depending curtain block also on the side of the sheet toward the melting tank.

2. The combination with a glass melting tank and a glass drawing tank communicating therewith at one end and provided with a top having a transverse sheet drawing opening, of transversely extending refractory means, having a horizontal portion extending below the line of generation of the sheet to be drawn and serving to segregate the glass thereabove from the main body of glass in the drawing tank and having a vertical portion lying intermediate said sheet and the melting tank and extending above the surface of the glass, and a depending curtain block also on the side of the sheet toward the melting tank and having its lower edge above said vertical portion of the refractory means and forward thereof.

3. The combination with a glass tank, of sheet drawing means; a pair of opposing endless belts of refractory material above the tank adapted to receive the sheet of glass, a second pair of opposing endless belts of refractory material in alinement with the first pair, and a chamber intermediate the two sets of belts.

4. The combination with a glass tank, of sheet drawing means; a pair of opposing endless belts of refractory material above the tank adapted to receive the sheet of glass, a second pair of opposing endless belts of refractory material in alinement with the first pair, and a chamber intermediate the two sets of belts, said chamber being provided with temperature regulating means.

5. The combination with a glass tank, of sheet drawing means; a pair of opposing endless belts of refractory material above the tank adapted to receive the sheet of glass, a second pair of opposing endless belts of refractory material in alinement with the first pair, and a chamber intermediate the two sets of belts, said chamber being provided with heating means.

6. The combination with a glass tank, of sheet drawing means; a pair of opposing endless belts of refractory material above the tank adapted to receive the sheet of glass, a second pair of opposing endless belts of refractory material in alinement with the first pair, and a chamber intermediate the two sets of belts, said chamber being provided with heating means, and regulating dampers to permit the escape of heated gases from the chamber.

7. The combination with a glass tank, of sheet drawing means, a plurality of sets of opposing endless belts of refractory material above the tank in the line of movement of the glass sheet, and chambers between the adjacent ends of said sets of belts.

8. The combination with a glass tank, of sheet drawing means, a pair of opposing endless belts of refractory material above the tank adapted to receive the sheet of glass drawn, and a second pair of opposing endless belts of refractory material with the ends thereof adjacent the discharge end of the first set of belts and adapted to receive the glass sheet.

9. The combination with a glass tank, of sheet drawing means, a pair of opposing endless belts of refractory material above the tank adapted to receive the sheet of glass drawn, a second pair of opposing endless belts of refractory material with the ends thereof adjacent the discharge end of the first set of belts, and heating means for the sheet intermediate the two sets of belts.

10. In combination in apparatus for drawing glass in sheet form continuously from a bath of molten glass, a pair of opposing belts or bands of flexible asbestos fabric, endless chains at the edges of the belts, and yielding supporting means between the belts and chains for pressing the belts against the glass sheet lying therebetween.

11. In combination in apparatus for drawing glass in sheet form continuously from a bath of molten glass, a pair of opposing belts or bands of flexible asbestos fabric, endless chains at the edges of the belts, bars extending transversely between the chains, and means yieldingly mounted on the bars engaging the rear faces of the belts for pressing the belts against the glass sheet lying therebetween.

12. In combination in apparatus for drawing glass in sheet form continuously from a bath of molten glass, a pair of opposing belts or bands of flexible asbestos fabric, endless chains at the edges of the belts, bars extending transversely between the chains, and a series of spring pressed plungers on each bar engaging the rear faces of the belts.

13. In combination in apparatus for drawing glass in sheet form continuously from a bath of molten glass, a pair of opposing belts or bands of flexible asbestos fabric, means for driving the belts, and a plurality of independently movable presser devices arranged in series across the backs of the belts and yieldingly engaging the belts to cause them to engage the glass sheet lying therebetween.

14. In combination in apparatus for drawing glass in sheet form continuously from a bath of molten glass, a pair of opposing belts or bands of flexible asbestos fabric, means for driving the belts, and a plurality of independently movable presser devices arranged in series across the backs of the belts and yieldingly engaging the belts to cause them to engage the glass sheet lying therebetween, the said devices being mounted to move along with the belts.

15. In combination in apparatus for drawing glass in sheet form continuously from a bath of molten glass, a pair of opposing belts or bands of flexible asbestos fabric, means for driving the belts, and a plurality of rows of independently movable presser members arranged in series across the backs of the belts, said members being arranged to yieldingly engage the backs of the belts to cause them to engage the glass sheet lying therebetween.

In testimony whereof, I have hereunto subscribed my name this 25th day of November, 1918.

HARRY G. SLINGLUFF

Witnesses:
BANNER M. ALLEN,
J. W. JONES.